INVENTORS
EVERETT L. NOONAN JR.
ROBERT A. JUD
BY

ATTORNEYS

INVENTORS
EVERETT L. NOONAN, JR.
ROBERT A. JUD
BY

ATTORNEYS

July 16, 1968 R. A. JUD ETAL 3,392,627
PROJECTION SYSTEM FOR PRODUCING THE EFFECT OF A MOTION PICTURE
FROM A PLURALITY OF SLIDE TRANSPARENCIES
Filed July 27, 1965 6 Sheets-Sheet 4

INVENTORS
EVERETT L. NOONAN, JR.
ROBERT A. JUD
BY
ATTORNEYS

July 16, 1968

R. A. JUD ETAL 3,392,627

PROJECTION SYSTEM FOR PRODUCING THE EFFECT OF A MOTION PICTURE
FROM A PLURALITY OF SLIDE TRANSPARENCIES

Filed July 27, 1965

INVENTORS
EVERETT L. NOONAN, JR.
ROBERT A. JUD
BY
*Kenyon & Kenyon*
ATTORNEYS

INVENTORS
EVERETT L. NOONAN, JR.
ROBERT A. JUD
BY

ATTORNEYS

United States Patent Office 3,392,627
Patented July 16, 1968

3,392,627
PROJECTION SYSTEM FOR PRODUCING THE EFFECT OF A MOTION PICTURE FROM A PLURALITY OF SLIDE TRANSPARENCIES
Robert A. Jud, Englishtown, N.J., and Everett L. Noonan, Jr., North Guilford, Conn., assignors to Bankers Trust Company, New York, N.Y., a corporation of New York
Filed July 27, 1965, Ser. No. 475,186
6 Claims. (Cl. 88—28)

ABSTRACT OF THE DISCLOSURE

The projector includes dual superimposed projection paths for projecting selected portions of sequentially positioned slide transparencies onto a screen in a manner to simulate a motion picture. The slides are moved vertically, horizontally or obliquely across the projection paths by carriage means within the projector. The projector also includes variable focal length lens systems for changing the magnification of the projected images and variable aperture irises for dissolving one transparency image into another.

---

This invention relates to a projection system. More particularly, this invention relates to a projection system for slide transparencies. Still more particularly, this invention relates to a projection system for producing a projected dynamic visual effect from a slide transparency. Still more particularly, this invention relates to a projection system which produces the effect of a sound motion picture from the utilization of a plurality of slide transparencies and an audio narration and signaling means.

It is commonly known that a slide transparency can be projected onto an enlarged screen by any well-known slide projector. However, this manner of projection is static, that is, there is no movement of the projected scene on the screen in relation to the eye of the viewer.

Attempts have been made in the past to impart a dynamic effect to the projected images of slide transparencies, that is, an effect which creates a sense of a motion picture to the eye of the viewer. An example of such attempts is a method which consists of projecting a slide transparency on a screen and then, by moving a camera, such as a television camera or a motion picture camera, across the projected scene on the screen, a series of pictures are recorded. These recorded pictures are then shown on a second screen to a viewer as a motion picture. However, it is apparent that this method of obtaining dynamic characteristics from slide transparencies is cumbersome, expensive and time-consuming, and also introduces quality degeneration into the final effect. Further, in order to provide an audio narrative to the finally obtained motion picture, it is necessary to schedule the narration to depend on the filmed sequence of pictures. Such scheduling is, of course, likewise time-consuming and cumbersome.

A further attempt of obtaining a dynamic effect from slide transparencies is disclosed in U.S. Patent No. 3,183,770.

This invention overcomes the disadvantages of the prior art by providing a projection system which produces the effect of a sound motion picture from a series of slide transparencies and an audio narration and signaling means. The series of slide transparencies which can be of the still type or film strip type are fed into the projection system so that the images of individual slide transparencies can be projected to a screen for viewing. The projection system includes a means for varying the magnification of the projected image of a slide transparency. In addition, the magnification system controls the size of the projected image on the screen so that a constant-sized image is continuously projected onto the screen. In effect, after the magnification means has been operated to magnify the image of the slide transparency, only a portion of the entire slide transparency image is projected on the screen. Further, the projection system includes a panning means which is utilized after the projected slide transparency image has been magnified on the screen. The panning means operates to permit the unprojected portions of the slide transparency to be projected to the screen in a contiguous manner by moving the slide transparency in relation to the optical path through the magnification means. Thus, different contiguous portions of the slide transparency can be projected to the screen in a continuous manner.

The projection system also includes a superimposing means which is operated to allow projection of the images of disparate slide transparencies in a superimposed manner or in sequential order. Thus, by continually feeding the series of slide transparencies into the projection system and projecting various portions of their images in the above manner, a continuous motion picture effect is obtained on the screen.

The audio narration and signaling means is provided with a narrative sound track which effects the audio narrative for the sequence of visual images projected by the projection system from the slide transparencies as well as a signal channel which is programmed with respect to the sound track with appropriate signals to actuate the several means utilized to project the portions of the slide transparency images. Since the signals depend on the narration recorded on the sound track, the sequence of operations of the several means utilized to project the respective images are timed in respect to the sound track. Thus integration of the narrative of the sound track with the continually projected image is achieved in an efficient manner both timewise and economically to produce a sound motion picture effect.

Accordingly, it is an object of this invention to provide a projected dynamic visual effect from a slide transparency.

It is another object of this invention to provide a projection system for obtaining a dynamic visual effect from a slide transparency.

It is another object of this invention to provide a projection system for obtaining a continuous motion picture from a series of slide transparencies.

It is another object of this invention to provide a projection system for obtaining a continuous sound motion picture utilizing a series of slide transparencies.

It is another object of this invention to provide a projection system producing dynamic visual effects from slide transparencies wherein the system includes a zoom lens system and a panning means.

It is another object of this invention to provide a projection system producing dynamic visual effects from slide transparencies wherein the system includes a superimposing means for superimposing the images of disparate slide transparencies.

These and other objects and advantages of the invention will become more apparent from the following detailed description and appended claims when taken in conjunction with the accompanying drawings in which:

Figure 1:
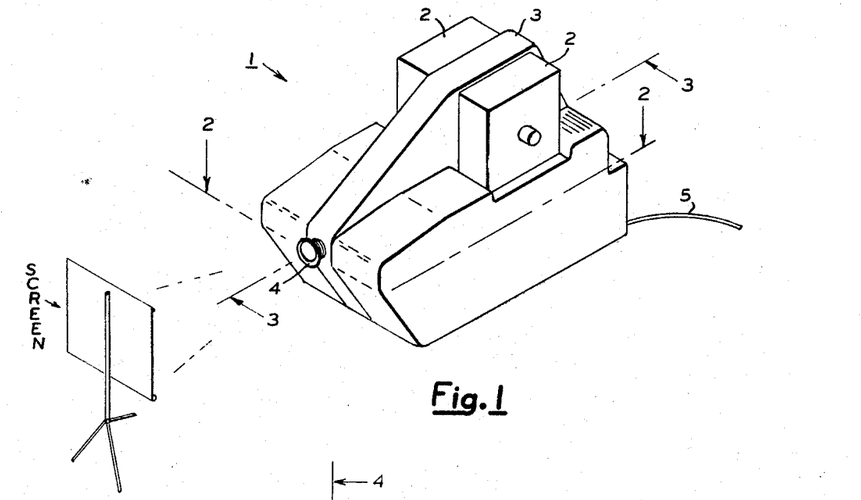
FIG. 1 illustrates a perspective view of an apparatus utilized in the projection system of the invention.

Referring to FIG. 1, the projection system is illustrated as being incorporated in a single projector 1 although it may be incorporated in a plurality of projectors which are properly aimed at a target screen for superimposing of the respective optical paths.

The projector 1 is provided externally with a pair of slide transparency magazines about a centrally located upstanding rib 3 and with a projection lens at its front end. The projector 1 is connected to a source of power by a suitable means such as an electric cord 5.

Figure 2:
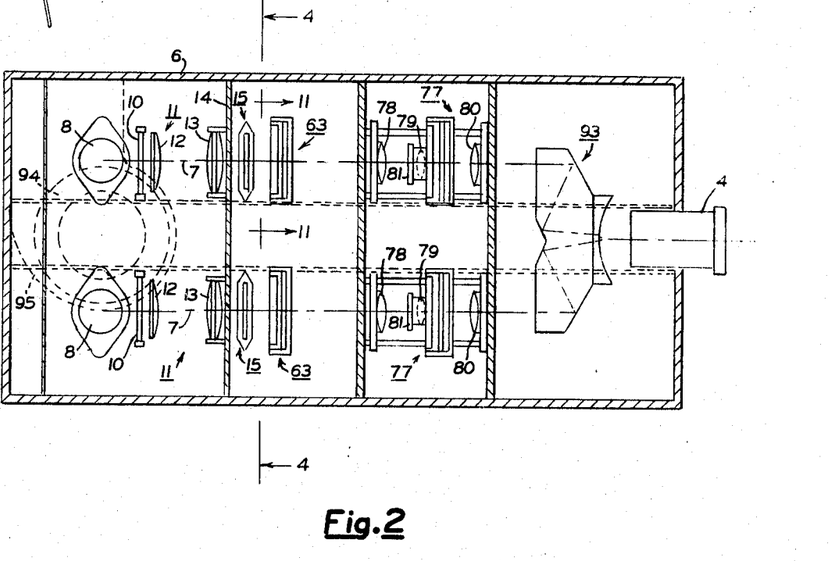
FIG. 2 illustrates a view taken at line 2—2 of FIG. 1 showing a sectional plan view of the components of the apparatus embodying the invention.
Figure 3:
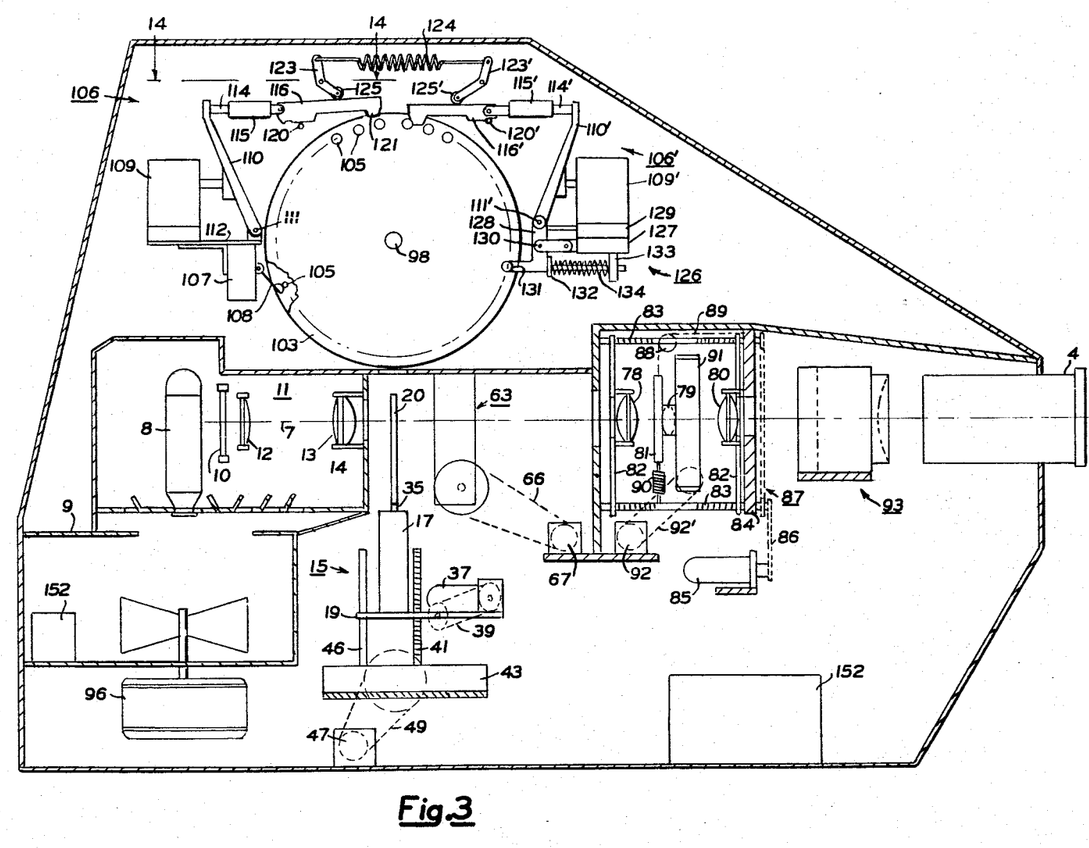
FIG. 3 illustrates a view taken at line 3—3 of FIG. 1 showing a sectional side view of the components of the apparatus.
Figure 4:
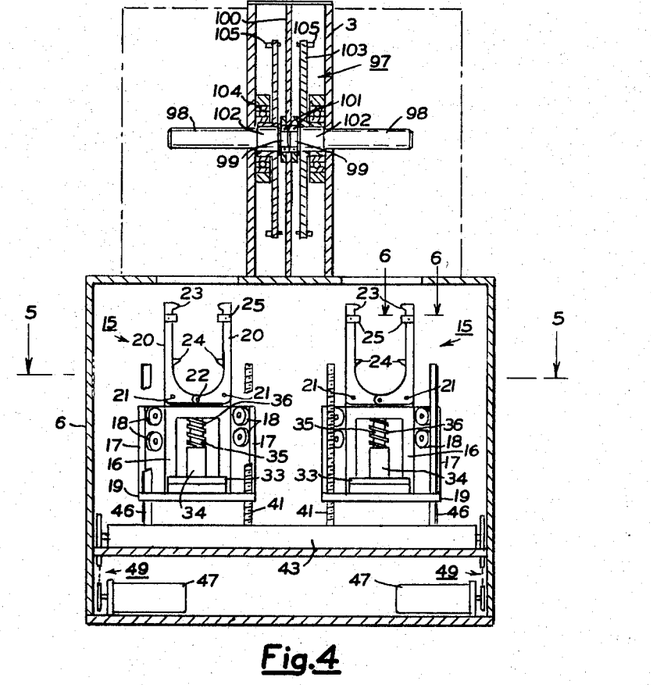
FIG. 4 illustrates a view taken at line 4—4 of FIG. 1 showing a slide transparency carriage utilized in the projection system of the invention.

Referring to FIGS. 2 and 3, the projector 1 comprises a housing 6 which envelops a pair of coaxial projection means therein. Each projection means forms an optical path 7 and has a fixed light source 8, such as a reflector lamp or reflector and lamp which is suitably mounted at one end of the housing 6 on a perforated mounting plate 9. A suitable heat filter 10 which is supported from the housing frame is positioned between the reflector lamp 8 and condenser lens system 11; however, the heat filter 10 can be positioned on the other side of the condenser lens system 11 from the light source where such is desirable. The condenser assembly 11 acts as a light control course to concentrate the light of the reflector lamp for the size of the slide transparency being projected and is composed of any suitable series of lenses, for example, a single concave lens 12 and a double concave lens 13 suitably ground to the desired curvatures. As shown in FIG. 3, the double concave lens 13 is fixedly mounted in a wall 14 of the housing 6. The lens 12 is also fixedly mounted to the housing (not shown).

Referring to FIGS. 3 to 6, a pair of panning means, such as movable slide transparency carriages 15 are slidably mounted in a guideway 43, each in an optical path 7 adjacent condenser lens system 11. Each movable slide transparency carriage 15 consists of a substantially inverted U-shaped block 16 which is slidably mounted, as by rollers 18 between a pair of guide posts 17 which are secured to a mounting plate 19. The U-shaped block 16 mounts a pair of extractor arms 20 in pivotal manner thereon, as by a pivot 21. The extractor arms 20 are of substantially L-shape and are pivotally pinned together by a suitable means, such as a pin 22 at the shorter leg portions. Each extractor arm 20 is provided with a flange 23 at the extremity thereof and an abutment ledge 24 spaced below the flange 23. The flanges 23 and ledges 24 of the extractor arms 20 are spaced so as to define a space which when in closed position defines the dimensions of a slide transparency, for example, a space 2 inches by 2 inches. In order to further secure a slide transparency in position, each extractor arm 20 can be provided with a spring clip 25.

Figure 6:
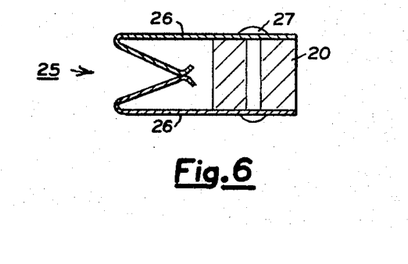
FIG. 6 illustrates a view taken at line 6—6 of FIG. 4.

Referring to FIG. 6, the spring clip 25 is comprised of a pair of leaf springs 26 which are secured to the extractor arm 20 by a suitable means, such as a rivet 27. The springs 26 are formed with arcuate ends and so opposed to each other that their respective ends are biased against each other. Accordingly, no matter the thickness of a slide transparency, the image of the slide transparency is precisely positioned in the critical focal plane along the optical path.

Figure 5:
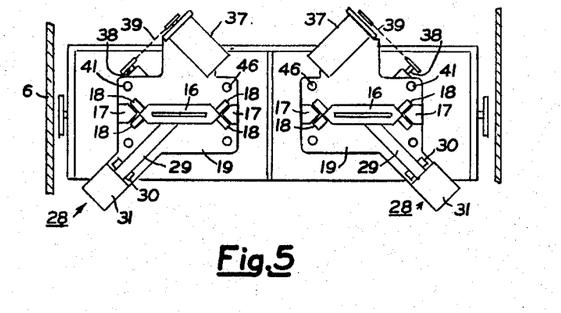
FIG. 5 illustrates a plan view of the slide transparency carriage taken at line 5—5 of FIG. 4.
Figures 7, 8, 9, 10:
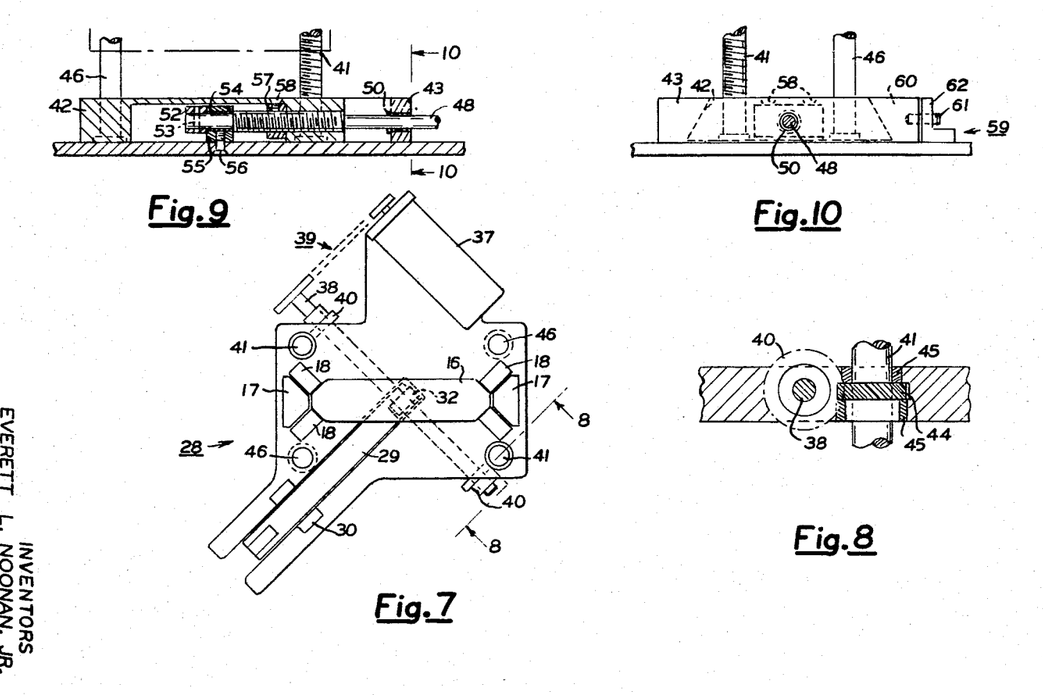
FIG. 7 illustrates an enlarged plan view of the vertical drive means for the slide transparency carriage.
FIG. 8 illustrates a view taken at line 8—8 of FIG. 7.
FIG. 9 illustrates a view of the horizontal drive means for the slide transparency carriage.
FIG. 10 illustrates a view of the horizontal drive means taken at line 10—10 of FIG. 9.

Referring to FIGS. 5 and 7, the slide transparency carriages 15 include a vertical lift mechanism 28 therein for raising the extractor arms 20 out of the projector housing 6 in order to grasp a slide transparency from a suitable slide transparency magazine. The vertical lift mechanism 28 consists of a pivot arm 29 mounted on a pivot 30 on the mounting plate 19 which is actuated by any suitable signal responsive means 31, such as a solenoid. The pivot arm 29 contacts, for example, through a roller 32 mounted on its end, a vertically movable plate 33 fixedly secured to the base of the U-shaped block 16. The plate 33 mounts an extractor arm actuating means 34, such as a solenoid, between the upstanding leg portions of the block 16. The actuating means 34 has a piston 35 which passes through the cross bar of the block 16 and actuates the pin 22 pivotally connecting the extractor arms 20 in a vertical plane. A compression spring 36 envelops the piston 35 between the actuating means 34 and block 16.

In operation, the pivot arm 29 lifts the U-shaped block 16 vertically between the guide posts 17 so as to pass the extractor arms 20 out of the housing 6 and into a slide transparency magazine 2. At the same time, the actuating means 34 cause the extractor arms 20 to pivot outwardly with respect to each other so that there will be sufficient clearance between the flanges 23 to permit passage of a slide transparency therethrough. When the extractor arms 20 achieve the proper position, the actuating means 34 is actuated to bring the extractor arms 20 back to their closed position. This causes a slide transparency to be positioned btween the pairs of ledges 24 and flanges 23 and in the spring clips 25. The pivot arm 29 is then actuated to allow the plate 33 and block 16 to move downwardly so that the captured slide transparency is moved out of the magazine 2 into the optical path 7, so that the center of the image of the slide transparency is centered in the optical path 7.

Referring to FIGS. 3, and 7 to 10, in order to move a slide transparency carriage 15 horizontally and vertically after a slide transparency is mounted therein, a suitable motor and gear means is provided in the housing 6 for each type of movement. A reversible drive motor 37 is fixedly mounted on the mounting plate 19 opposite the vertical lift mechanism 28 and drives a rotatable shaft 38 through a suitable pulley and belt drive 39. The shaft 38 is rotatably mounted in a bore in the plate 19 and has a pair of helical gears 40 mounted near each end thereof. The shaft 38 is positioned with respect to a pair of vertical screws 41 which are fixed in a slide block 42 in the guideway 43 and which pass through two diagonal corners of the mounting plate 19 so that each gear 40 threadably engages an internally and externally threaded sleeve 44 mounted on each screw 41. Each sleeve 44 is retained in fixed relation to the mounting plate 19 by a pair of suitable bushings 45. Thus, upon rotation of the shaft 38 by the motor 37, the mounting plate 19 is moved vertically with respect to the fixed screws 41. A pair of guide posts 46 slidably pass through suitable bushings in the other corners of the mounting plate 19 and are also fixed to the frame 42 in the guideway 43 in order to insure uniform vertical movement of the mounting plate 19.

A reversible horizontal drive motor 47 is fixedly mounted in the housing 6 below the guideway 43 and drives a shaft 48 mounted in the slide block 42 by means of a suitable pulley and belt drive 49. The shaft 48 extends through a suitable bushing 50 in the guideway 43 and through a part of the slide block 42. The end of the shaft 48 is provided with an enlarged shouldered collar 52 which is secured thereto as by a locking screw or pin 53. The enlarged collar 52 is rotatably mounted as by a suitable bushing 54 in a mounting block 55 which is fixedly mounted on the guideway 43 as by a pair of screws 56. The shaft 48 is provided with a threaded portion between mounting block 55 and the edge of the slide block 42. An internally threaded nut 57 is mounted on the threaded portion of the shaft 48 and is secured as by a pair of screws 58 to the slide block 42. Thus, upon rotation of the shaft 48 by the motor 47, the slide block 42 is caused to slide within the limits of the guideway 43.

The guideway 43 is provided with a suitable adjustment device 59 which utilizes an elongated block 60 actuated by a plurality of screws 61 acting through a fixed support 62.

The vertical and horizontal drive motors 37, 47 are actuated by any suitable means, as for example, by appropriate signal means. The motors are utilized one at a time or simultaneously to move a slide transparency vertically, horizontally or diagonally in respect to the optical path 7 so as to achieve a visual panning effect on a screen.

Referring to FIGS. 2, 3 and 11 to 13, a gate 63 is fixedly positioned from the housing 6 in the optical path 7 adjacent the slide transparency carriage 15. Alternatively, the gate 63 can be positioned between the light source 8 and condenser assembly 11. The gate 63 consists of a box-like frame 64 through which a rotatable shaft 65 passes; the shaft 65 being driven through a suitable pulley arrangement 66 by a reversible motor 67 such as a servo motor which is under the control of the motor of the magnification means as hereinafter described. The shaft 65 is mounted in opposite sides of the box-like frame 64 and has an intermediate threaded portion, one-half of which is threaded oppositely to the other half. A pair of helical gears 68 are each fixedly mounted on the shaft 65 between a threaded adjusting nut 69 and a bushing 70. A driven shaft 71 is mounted in the box-like frame 64 at a spaced position from the shaft 65. The driven shaft 71 is mounted in the frame 64 and provided with only one helical gear 68 in similar fashion to the shaft 65.

Figure 11:
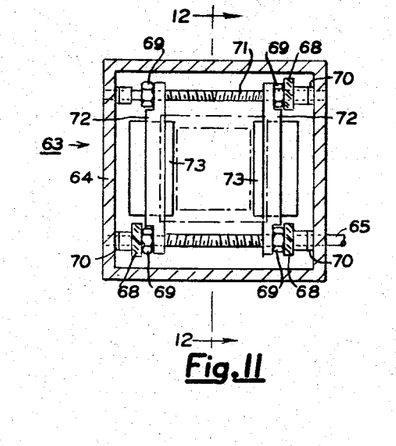
FIG. 11 illustrates a view taken at line 11—11 of FIG. 2 showing a gate embodying the means for controlling the shape of the projected image in the projection system of the invention.
Figures 12, 14, 15:
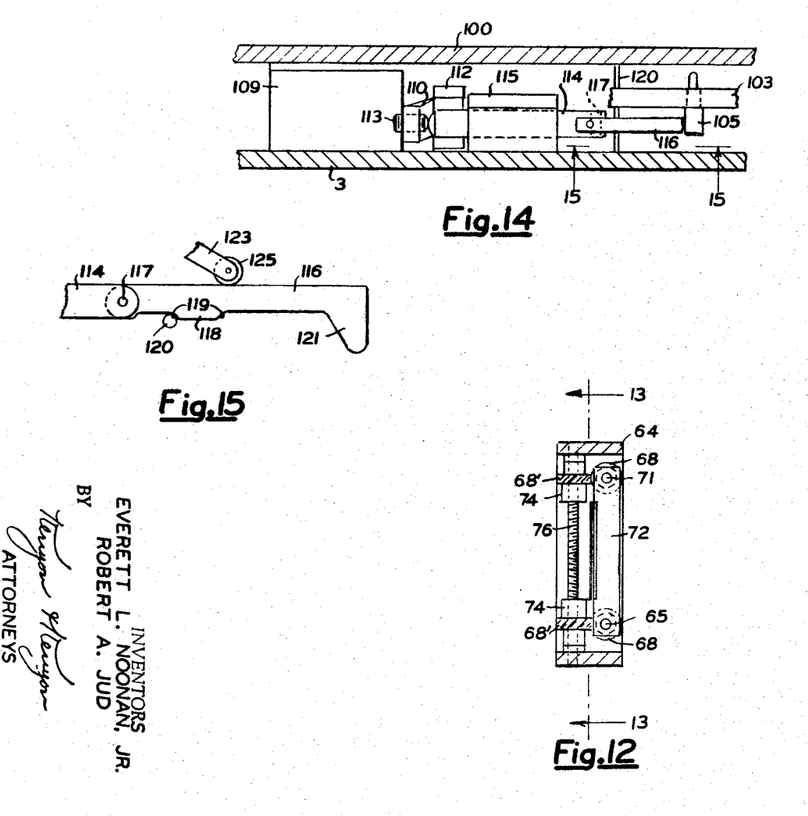
FIG. 12 illustrates a view of the gate taken at line 12—12 of FIG. 11.
FIG. 14 illustrates a view of a slide magazine actuating means taken at line 14—14 of FIG. 3.
FIG. 15 illustrates a view taken at line 15—15 of FIG. 14.
Figure 13:
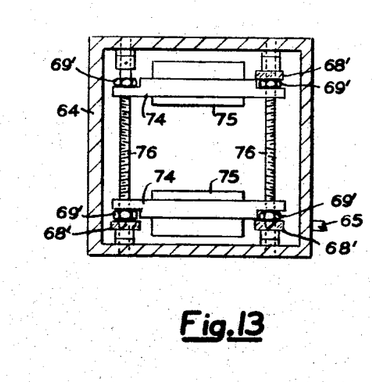
FIG. 13 illustrates a view of the gate taken at line 13—13 of FIG. 12.

A pair of cross bars 72 are slidably mounted on respective pairs of the threaded nuts 69 on the shaft 65 and driven shaft 71. Each of the cross bars 72 has a flat plate 73 secured thereto. The flat plates 73 are positioned on the respective cross bars 72 so that they are in overlapping planes.

The boxlike frame 64 is also provided with a second pair of cross bars 74 which carry flat plates 75 and which are threadably mounted by respective pairs of threaded adjusting nuts 69' on a pair of rotatable shafts 76 similar to driven shaft 71. The cross bars 74 are mounted in the frame 64 at ninety degree angles to the shafts 65, 71 and are operably connected thereto through helical gears 68'. The flat plates 73 and 75 of the respective cross bars 72, 74 are in overlapping planes and are moved simultaneously to shape the size of the projected image in the optical path 7 from a slide transparency in the carriage 15.

In operation, when the shaft 65 is actuated by the motor 67 so as to close the opening formed by the plates 73, 75, the turning of shaft 65 causes the helical gears 68 thereon to drive a helical gear on each of the shafts 76 below it. The consequent rotation of the one shaft 76 having the pair of helical gears thereon causes the shaft 71 to rotate through means of their interengaging helical gears. The rotations of the respective shafts 65, 71, 76 are related so that the plates 73, 75 move either simultaneously towards or away from one another.

Referring to FIGS. 2 and 3, a magnification means 77, such as a zoom lens system which is of known suitable structure, is positioned in the optical path 7 adjacent the gate 63. For example, the zoom lens system comprises three spaced lenses 78, 79, 80 and an iris diaphragm 81. The lenses 78, 80 are mounted in suitably apertured plates 82 which are threadably mounted on a plurality of rotatable shafts 83, one at each corner of the plates 82. The shafts 83 are journalled at one end in the housing 6, project at the other end through a wall 84 of the housing 6 and are suitably driven by a reversible motor 85. The motor 85 drives the closest shaft 83 by means of a suitable pulley and belt drive 86 while this shaft drives the other shafts by means of a suitable sprocket and chain assembly 87. The respective shafts 83 are threaded in opposite manner about the midpoints so that upon rotation of the shafts by the motor and drives 85, 86, 87 the apertured plates 82 move toward or away from each other depending on the direction of rotation imparted by the motor 85. In addition to driving the zoom lens system, the motor 85 can be connected by means of a suitable link (not shown) to the gate motor 67, so that the zoom lens system and gate 63 can be operated in synchronism in order that the gate 63 may shape the projected image on the screen no matter the image size projected. Further, the motors 67, 85 are actuated by a suitable signal means.

The iris diaphragm 81 which controls the speed of the magnification system 77 by maintaining a constant light transmission level or speed, is mounted in a suitable manner (not shown) in the zoom lens system and is actuated in a conventional manner. For example, the iris diaphragm is actuated by means of a pulley device 88 which is suitably mounted from the housing 6 and which includes a cable 89 secured at one end to a plate 82 and at the other end to the iris diaphragm 81. The cable 89 is spring biased by a counter-spring 90 which is mounted on one of the shafts 83 so that the iris diaphragm will respond to the relative movement of the lenses 78, 80 in a manner whereby the iris diaphragm approaches a closed position as the lenses 78, 80 move toward each other and vice versa.

An image arresting means, such as a shutter diaphragm means 91 is mounted from the housing 6 in any suitable manner and positioned in the optical path 7. The shutter diaphragm means 91 for purposes of description is identical to the gate 63 described above and is driven in similar manner by a reversible motor 92 and pulley drive 92'. The shutter diaphragm 91 when positioned in the magnification means 77 may also serve as a mounting means for the intermediate lens 79. The motor 92 allows the shutter diaphragm 91 to be opened and closed in a gradual manner through the drive 92'; however, in order to open and close the shutter diaphragm in a rapid manner any suitable means (not shown) can be incorporated in the circuit of the motor 92 to speed up the opening and closing operation of the drive 92'. As above, the motor 92 is actuated by a suitable signal means.

A unitizing means 93, such as a prism or mirror assembly, is mounted in the housing 6 astride both optical paths 7 and is contoured to direct the optical paths 7 into superimposition at a point before projection lens 4 to correct and align the superimposed optical paths 7. A correcting lens can also be provided on the outside of the prism.

The projection lens 4 is mounted as by threading in the housing 6 in the superimposed optical paths 7. The projection lens 4 also operates as a conventional enlarging lens to adjust for the distance between the lens and the screen.

A blower 94 is positioned in a volute 95 in the housing 6 below the reflector lamps 8 and perforated mounting plate 9 in order to provide a cooling effect to dissipate the heat produced by the lamps 8. The blower 94 is driven by a blower motor 96 which is actuated in a suitable fashion, as by a separate switch. The air is circulated through the perforated plate 9 across the lamps 8 and back through the plate 9. The housing 6 may also be provided with suitable vents to allow communication of the circulated air with the exterior of the projector 1.

Referring to FIGS. 3, 4, 14 and 15, the projector housing 6 is provided with a suitable magazine actuating means 97. For example, the magazine actuating means comprises a pair of wheel shafts 98 each of which is rotatably mounted in the housing rib 3. Each shaft 98 is provided with a stub shaft portion 99 on its end which is journalled independently of the other shaft 98 in a center plate 100 of the housing rib 3 by means of a suitable antifriction bearing 101. Each shaft 98 is also provided with an enlarged collared portion 102 which fixedly mounts a circular plate 103 thereon. The circular plate 103 is flanged and rotatably supported in a second antifriction bearing 104 in the wall of the housing rib 3. Also, the circular plate 103 is provided with a series of pins 105, for example fifty-one equispaced pins, at its outer periphery.

The projector housing 6 is also provided with an automatic wheel actuating system 106 in the upstanding rib portion. The system 106 comprises a microswitch 107 which is provided with a spring finger 108 which projects into the plane of the circular plate 103 to contact a pin 105 thereon. The wheel actuating system 106 further comprises a solenoid 109 which actuates a lever 110 to pivot about a fixed pivot joint 111 on a support plate 112 in the housing rib 3. The lever 110 has an adjustable contact point 113 at its upper end which is formed of any suitable means, such as a blunt-headed screw. The contact point 113 is in abutment with a plunger 114 which is slidably mounted in a bearing block 115 fixed to the wall of the housing rib 3 and which mounts a hinged finger 116 on its other end by means of a pin 117. The hinged finger 116 is provided with an enlarged cross-sectional intermediate portion 118 having inclined shoulder 119 at its edges. The shoulder 119 cooperates with a cam rod 120 fixedly mounted in the housing rib 3 which causes the hinged finger 116 when slid forward by the plunger 114 to pivot in a vertical plane about the pin 117 in the plunger 114. The free end of the hinged finger 116 is provided with a detent 121 which is dimensioned to fit into abutment with a pin 105 in the circular plate 103.

In operation, the solenoid 109 actuates the lever 110 to pivot outwardly thereof and to slide the plunger 114 through the bearing block 115. The hinged finger 116 on the end of the plunger being coaxial with the plunger 114 engages a pin 105 and pushes it so that the circular plate 103 is rotated. As shown in FIG. 3, the rotation is clockwise. When the finger 116 has rotated the plate 103 an incremental distance a shoulder 119 contacts the cam rod 120 and directs the finger 116 in a pivotal path about the hinging pin 117 so as to move the detent 121 out of engagement with the pin 105. The plunger 114 is then slid back to its original position by a suitable retracting spring (not shown) in the bearing block 115 thereby returning the hinged finger 116 to a coaxial position with the plunger 114. The hinged finger 116 is then in position to be pushed into engagement with the second of the series of pins 105.

A similar wheel actuating system 106' is mounted to the other side of a vertical plane through the housing 6 when reversibility of the direction of rotation is desired. The wheel actuating system 106' is similar to the wheel actuating system 106 and primed reference characters are used to indicate like parts.

In order to synchronize the operation of the wheel actuating wheel systems 106, 106', a suitable cam assembly 122 is mounted in the rib portion 3 in cooperation with the systems. For example, a cam assembly comprises a pair of angled lever arms 123, 123' fixedly mounted in the housing rib 3 and operably connected to each other by a tension spring and arm means 124. Each lever arm 123 has a cam roller 125 mounted at its free end which contacts a hinged finger 116. The cam assembly is constructed to permit one lever arm 123 to be in a retracted position with respect to a hinged finger 116 while the other is in extended position. This permits one of the plungers 114 to push the circular plate 103 by means of its respective hinged finger 116 when the respective lever arm 123 is in resilient engagement with the finger 116, i.e., extended. During the rotation of the plate 103, the other hinged finger 116' is out of contact with the pins 105 and the enlarged cross-sectional portion 118' is resting on the cam rod 120'. Also, the respective lever arm 123' is raised out of resilient engagement with the hinged finger 114', i.e., retracted. This operation can be reversed so that the plate 103 can be rotated in opposite manner. As above, the solenoids 109, 109' are actuated by the suitable signal means.

The rib 3 of the housing 6 is also provided with a positive stop means 126 which is mounted below the solenoid 109' of the wheel actuating system 106'. The positive stop means 126 comprises a solenoid 127, a lever 128 pivotally mounted on a support plate 129 and actuated by a linkage 130 with the solenoid 127. The lever 128 has a detent 131 at its outer end which locks into a pin 105 of the plate 103 to arrest rotation. The lever 128 is biased in to the plane of the plate 103 by a piston 132 which is mounted on the solenoid 127 by a bracket 133 and actuated by a compression spring 134. In order to take the detent 131 out of the plane of the plate 103 the solenoid is actuated to retract the lever 128 through means of the linkage 130.

The operation of the positive stop means 126 is synchronized with the operation of the wheel actuating system 106 and activated, as above, by a suitable signal means.

Figure 16:
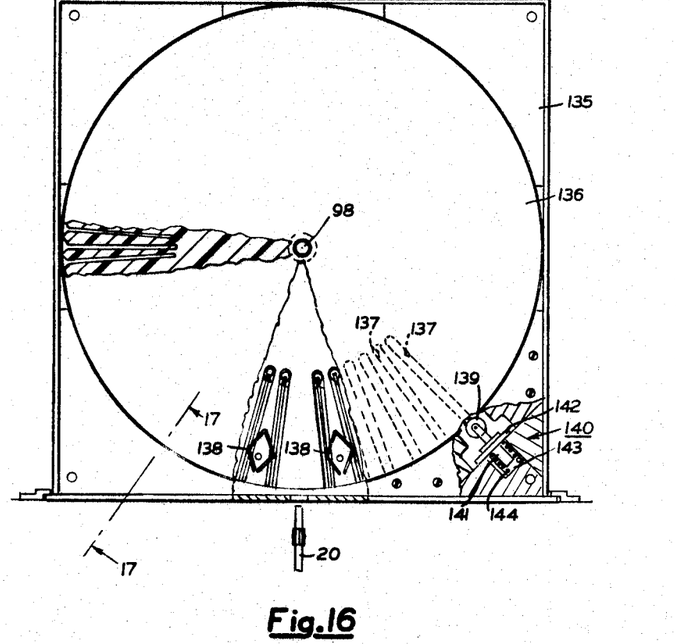
FIG. 16 illustrates a view of a slide transparency magazine utilized in the projection system of the invention.
Figure 17:
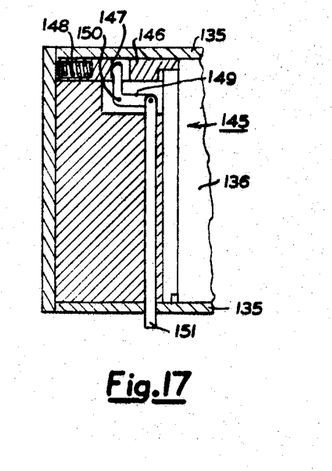
FIG. 17 illustrates a view taken at line 17—17 of FIG. 16.

Referring finally to FIGS. 16 and 17, a slide transparency feed means, such as a slide magazine 2 which may be one of many used with the projector 1, comprises a housing 135 which rotatably mounts a slotted wheel 136 therein. The wheel 136 is fixedly mounted on a shaft 98, as by a slight friction fit and is provided with fifty-one equispaced slots 137, one of which is blocked off, into which a series of slide transparencies, up to fifty in number, are positioned. The positions of the slots 137 correspond to the positions of the pins 105 on the wheel 103. Each slot 137 is provided with a retainer spring clip 138 which secures a slide transparency therein and is of sufficient width to allow the extractor arms 20 of the slide transparency carriage 15 to project therein. Each slot 137 is also provided with an enlarged portion at its mouth so that a retained slide transparency can be removed manually.

The magazine housing 135 is provided with a roller 139 mounted in a lower corner which is biased by a suitable spring mount 140 against the slotted wheel 136. The spring mount 140 comprises a yoke 141 which carries the roller 139 at one end while the other end passes through a suitable collar 142 into a chamber 143 in the magazine housing 135 and a compression spring 144 which is positioned around the yoke 141 in the chamber 143 and which biases the yoke 141 outwardly thereof. The spring biased roller 139 permits a smooth rotation of the wheel 136 while providing a stop by cooperation with the mouth of each slot 137.

Referring to FIG. 17, the magazine housing 135 is further provided with a fool-proof stop 145 in the lower corner opposite the roller 139. The fool-proof stop 145 comprises a finger 146 which has a slot 147 at an intermediate point and which is biased by a compression spring 148 towards an edge of the wheel 136 which is toothed so as to cooperate with the finger 146. A right angle lever arm 149 is pivotally mounted in the housing 135 by any suitable means, as by a pin 150. One leg of the arm 149 is secured to a reciprocal shaft 151 which projects out of the magazine housing 135 when the housing 135 is not mounted on the projector housing 6 and the other leg is dimensioned so as to move into and out of the slot 147 of the finger 146 upon actuation by the shaft 151. When the magazine 2 is not mounted on the projector, the shaft 151 is in extended position (FIG. 17); however, when the magazine 2 is mounted in proper position on the projector, the shaft 151 is slid into the magazine housing 135 towards the finger 146. The leg of the arm 149 in the slot 147 is urged against the spring 148 to pull the finger 146 out of the plane of the wheel 136 to permit the wheel to be rotated.

An alternate magazine can be utilized so that the extractor arms 20 can remain in the magazine while the magazine housing wheel is incrementally rotated. This magazine would be similar to described magazine except that the walls of the housing 135 would be spaced from the wheel 136 a sufficient distance to permit the opened extractor arms 20 to remain therein.

The operational components of the projector, that is, the various motors 37, 47, 85, 92, and solenoids 109, 127, are activated in appropriate sequence or simultaneity from suitable signals from an audio narration and signaling means. These signals are comprised of "start," "run" and "stop" codes in suitable combination. The signals are recorded, for example, on multiple tracks of a conventional audio magnetic tape together with an audio narrative in such a manner that the operational components which they control are activated to move synchronously with the sound (vocal narration, background music, sound effects, etc.) of the audio narrative to manipulate the slide transparencies in proper alternation and sequence, i.e., to extract slide transparencies from magazines, to move them in the focal plane of the optical paths (pan), to return them to the magazines, and to index or advance the magazines' drums, and to activate the magnification system and shutter diaphragms to produce a simulation of sound motion picture projection.

The audio narration and signaling means, for example, is fed into a suitable reproduction system 152 (FIG. 3) within the projector to actuate the projection system. By way of illustration, the reproduction system 152 includes a magnetic reproduction or sensing head, suitable amplifiers, a loud speaker system, control signal discriminator and pass circuits, an integrated supply and rewind magnetic tape reel, a reel mandrel and drive components. Such a system provides a drive system for a magnetic tape, a means for reading or sensing and channeling the audio and signal information on the tape to respective operational systems, and a means of distributing the operational signals to the appropriate projector drive systems' relays to cause the projector to function synchronously with the audio track to produce the visual and audio effects of a sound motion picture.

In operation, the multiple track magnetic tape is fed into the reproduction system 152. The sound and signals (voltage modulations), actually a spectrum of audio frequencies recorded on appropriate tracks of the tape, are read or sensed by the reproduction head. The signals are amplified and drive the audio system for sound and, through the relays, the various operational components of the projector. The spectrum of control signals are differentiated by known band pass filters or frequency discriminating, selecting means, or oscillator circuits, e.g., tuned resonant reed relays subdividing the frequency spectrum into the many desired control or operational channels. The duration of a projected image, a movement within a slide transparency, or a visual effect is controlled by the length of time a "run" signal is sustained, between "start" and "stop" codes on a control channel of the magnetic tape.

Thus, by first producing an audio narrative, the sequence of movements of the projector can be more easily made to correspond to the projected scene with the audio narrative.

Various functions can be performed with the projector of the projection system of the invention. These include a panning movement which is accomplished by moving a slide transparency in any transverse direction in the focal plane about the optical path by means of the slide transparency carriage 15 and a zooming movement which is accomplished through changes in the focal length of the zoom lenses. To "zoom in" means to move optically in on the minimum area of slide transparency from full slide aperture. In this movement, the narrowing field of view of the lens is accompanied by scene magnification with resulting constancy in the projected image size. A "zoom out" is the converse of the "zoom in" movement. Both the pan and zoom movements can be worked simultaneously; however, an initial and preparatory increase in the focal length of the zoom lens system is necessary to zoom in on a portion of a slide transparency before a panning movement can be made.

The projector 1 can also provide various effects. These effects are worked by the shutter diaphragms 91 in the zoom lens and include "cuts" which are accomplished by instantaneous opening or closing of the shutter, "fades" which are accomplished by a gradual opening or closing, and "dissolves" which are accomplished by synchronously overlapping a "fade in" one optical path with a "fade out" in the other optical path.

Additionally, any sequence of slide transparencies can be projected since the wheel actuating systems 106, 106' can be rotated in either direction.

The sequence of scene projections, and the various functions and effects, as well as, the audio narrative of the projection system of the invention all combine to produce the dynamic visual effect of a sound motion picture film.

While the invention has been thus described, it is not intended that the invention be so limited since certain modifications in carrying out the above process and the constructions which embody the invention may be made without departing from the scope of the invention. Accordingly, it is intended that all matter contained in the foregoing description or shown in the accompanying drawings shall be interpreted as illustrative and not in a limiting sense.

We claim:

1. A projection system comprising a first projection means for projecting an image of a slide transparency from a first series of slide transparencies in an optical path to a screen; a second projection means for projecting an image of a slide transparency from a second series of slide transparencies in an optical path to the screen; means for superimposing the projected images from said first and second projection means in a sequential order into a common optical path; means for arresting the projection of the image of a slide transparency from each of said series of slide transparencies; means for magnifying the projected image of a slide transparency in each optical path within constant size limits on the screen to project a portion of the image on the screen; a first magazine means for sequentially delivering said first series of slide transparencies to said first projection means; a second magazine means for sequentially delivering said second series of slide transparencies to said second projection means; first carriage means in the optical path of said first projection means including a pair of arms for receiving the slide transparencies of said first series therebetween; second carriage means in the optical path of said second projection means including a pair of arms for receiving the slide transparencies of said second series therebetween; a vertical lift mechanism connected to each of said pair of arms for reciprocally moving said respective pair of arms sequentially into one of said first and second magazine means to receive a respective slide transparency; and a motor and gear means connected to each said carriage means for moving said mounted carriage means transversely of the respective optical path of said one of said first and second projection means to move the received slide transparency transversely thereof.

2. A projection system as set forth in claim 1 which further comprises an audio means for effecting an integrated audio narrative with the projected portions of the received slide transparencies on the screen.

3. A projection system as set forth in claim 2 which further comprises means for simultaneously actuating said superimposing means, arresting means, magnification means, and first and second carriage means in a preprogrammed manner.

4. A projection system for producing a motion picture effect from a plurality of series of slide transparencies comprising:
   a housing;
   a plurality of projection means enclosed within said housing for forming a plurality of optical paths within said housing, each of said projection means being capable of projecting the image of a slide transparency from one of the series of slide transparencies to a screen outside said housing;
   lens means within said housing for directing said optical paths into a single common optical path within said housing to direct the image of the slide transparencies in said plurality of optical paths out of said housing perpendicularly to the screen;
   panning means mounted in each of said plurality of optical paths between one of said projection means and said lens means, said panning means including a carriage means for receiving a slide transparency from one of the series of slide transparencies, a vertical lift mechanism for reciprocating said carriage means outwardly and inwardly of said housing to receive a slide transparency upon movement outwardly of said housing, and a motor and gear means connected to said carriage means for moving said carriage means transversely of said optical path to move different contiguous portions of a received slide transparency into said optical path;
   magnification means mounted between said panning means and said lens means in each optical path for magnifying the projected image of a slide transparency;
   a gate disposed between said panning means and said magnification means in each optical path having pairs of oppositely movable plates for reciprocal movement relative to each other for limiting the portion of the slide transparency projected out of said housing, said gate being operatively connected with said magnification means to maintain the size of the projected image on the screen at a constant size during magnification of the projected image; and
   arresting means with said magnification means in each optical path for arresting the projection of the image of a slide transparency in said optical path out of said housing.

5. A projection system as set forth in claim 4 which further includes an audio means for effecting an integrated audio narrative with the projected portions of the slide transparency on the screen to produce a sound motion picture effect from the plurality of series of slide transparencies.

6. A projection system as set forth in claim 4 wherein said arresting means includes a shutter diaphragm and wherein a shutter diaphragm in one of said optical paths arrests the projection of the slide transparency image in said one optical path while a shutter diaphragm in another of said optical paths allows the projection of another slide transparency image in said another of said optical paths whereby a dissolve effect is created on the screen.

References Cited

UNITED STATES PATENTS

| | | | |
|---|---|---|---|
| 1,718,782 | 6/1929 | Griem | 352—135 |
| 3,183,770 | 5/1965 | Nyman et al. | 352—87 |
| 3,218,920 | 11/1965 | Johnson | 88—28 |
| 3,220,792 | 11/1965 | Vendig | 88—28 |

NORTON ANSHER, *Primary Examiner.*

R. M. SHEER, *Assistant Examiner.*